United States Patent
Jung et al.

(10) Patent No.: US 6,905,795 B2
(45) Date of Patent: Jun. 14, 2005

(54) POLYMER ELECTROLYTE AND A LITHIUM SECONDARY BATTERY HAVING THE SAME

(75) Inventors: Cheol-Soo Jung, Ohsan (KR); Takitaro Yamaguchi, Yokohama (JP); Ryuichi Shimizu, Yokohama (JP)

(73) Assignee: Samsung SDI Co., Ltd., Suwon-si (KR)

( * ) Notice: Subject to any disclaimer, the term of this patent is extended or adjusted under 35 U.S.C. 154(b) by 245 days.

(21) Appl. No.: 10/173,736

(22) Filed: Jun. 19, 2002

(65) Prior Publication Data

US 2003/0087159 A1 May 8, 2003

(30) Foreign Application Priority Data

| Jun. 19, 2001 | (JP) | ................................. 2001-184828 |
| Oct. 31, 2001 | (JP) | ................................. 2001-335667 |
| Nov. 7, 2001 | (KR) | ................................. 2001-69306 |
| Jan. 17, 2002 | (KR) | ................................. 2002-2708 |

(51) Int. Cl.$^7$ ............................................. H01M 10/40
(52) U.S. Cl. ..................... 429/189; 429/303; 429/314; 429/317; 29/623.5
(58) Field of Search ................................. 429/189, 303, 429/314, 317; 29/623.1, 623.5; 252/62.2

(56) References Cited

U.S. PATENT DOCUMENTS

| 4,357,401 A | * | 11/1982 | Andre et al. ............ 429/314 X |
| 5,433,892 A | * | 7/1995 | Czech .................... 252/62.2 X |
| 5,755,985 A | * | 5/1998 | Vallee et al. ................ 252/62.2 |
| 6,063,522 A | * | 5/2000 | Hamrock et al. ....... 429/303 X |
| 2003/0104283 A1 | * | 6/2003 | Yamaguchi et al. ......... 429/303 |

FOREIGN PATENT DOCUMENTS

JP    08-096852    4/1996

* cited by examiner

Primary Examiner—Stephen J. Kalafut
(74) Attorney, Agent, or Firm—Stein, McEwen & Bui, LLP

(57) ABSTRACT

A polymer electrolyte includes a gel-forming polymer electrolyte including a gel-forming compound connected at metal cations, and an organic electrolyte of a lithium salt and an aprotic solvent. The polymer electrolyte includes a gel-forming polymer electrolyte that includes at least one aziridine ring-containing compound, and an organic electrolyte of lithium salt and aprotic solvent.

37 Claims, 15 Drawing Sheets

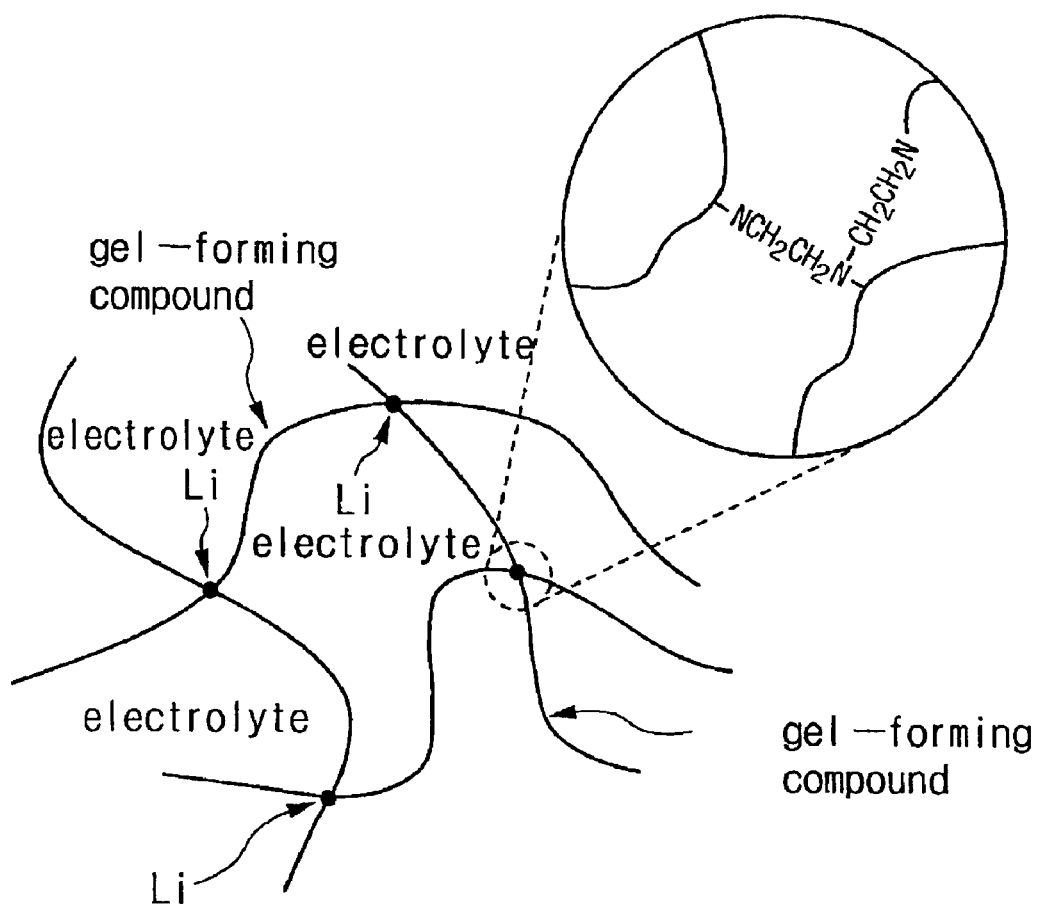

RN$^\delta$-Li$^+$-N$^\delta$-R : Li- aziridine bridge after several minutes lapsed after several hours lapsed

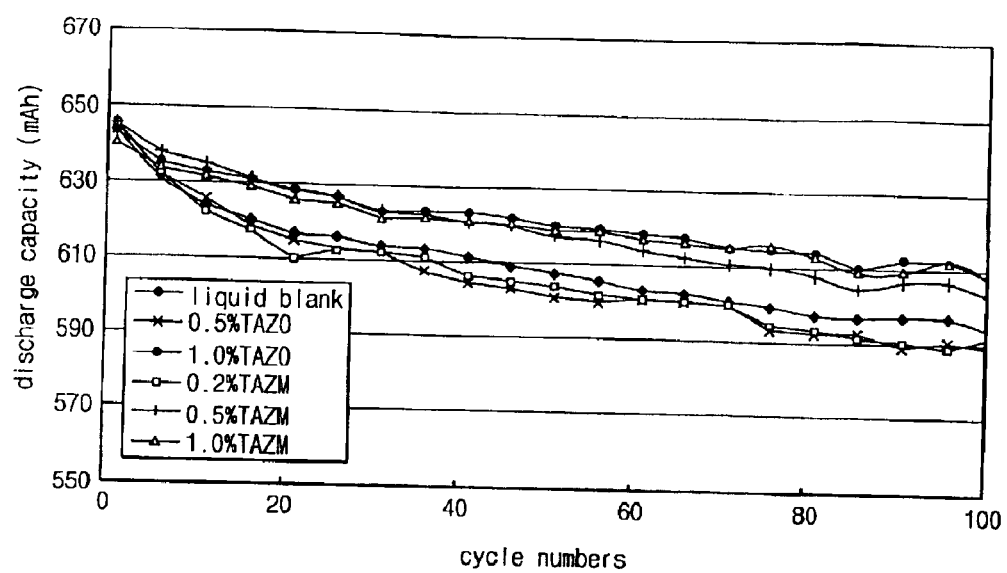

POLYMER ELECTROLYTE AND A LITHIUM SECONDARY BATTERY HAVING THE SAME

CROSS REFERENCE TO RELATED APPLICATIONS

This application claims the benefit of Japanese patent application No. 2001-184828, filed in the Japanese Patent Office on Jun. 19, 2001, Japanese patent application No. 2001-335667, filed in the Japanese Patent Office on Oct. 31, 2001, and Korean patent application No. 2001-069306, filed in the Korean Intellectual Property Office on Nov. 7, 2001, and Korean patent application No. 2002-002708, filed in the Korean Intellectual Property Office on Jan. 17, 2002, the disclosures of which are incorporated hereinto by reference.

BACKGROUND OF THE INVENTION

1. Field of the Invention

The present invention relates to a polymer electrolyte and a lithium secondary battery including the same, and more particularly, to a polymer electrolyte for a lithium secondary battery that does not dissolve at high temperature and can stably exist in the battery, and a lithium secondary battery including the same.

2. Description of the Related Art

According to the need for smaller, lighter, and more functional portable electric devices, lithium secondary batteries need to become thinner. Recently, thinner lithium secondary batteries have been produced by substituting a polymer electrolyte for a conventional organic electrolyte. Polymer electrolytes are classified into a physical gel type and a chemical gel type according to a preparation method thereof.

The physical gel type is manufactured in the following operations: making a paste by dissolving a polymer by adding an organic electrolyte thereto and heating the polymer organic electrolyte, fabricating a battery by spraying the paste on a sheet positive electrode and, at the same time, loading the negative electrode on the paste, inserting the battery into a battery container and sealing it, and cooling the paste to allow it to become the polymer electrolyte physical gel. A material that is easily gelated by the organic electrolyte and easily dissolves at 80 to 100° C. in the organic electrolyte is preferable as the polymer.

On the other hand, the chemical gel type is manufactured by the following operations: fabricating the electrode assembly by stacking a sheet positive electrode, a non-woven fabric, and a negative electrode, and inserting the electrode assembly, an organic electrolyte, a polymerization initiator, and a monomer such as one from a vinyl group into the battery container. The chemical gel polymer is fabricated by reacting the polymerization initiator with the monomer, with the polymerization of the monomer taking place in the battery container. It is generally preferable that the monomer produces a polymer that can easily gelate by reacting with the organic electrolyte.

The physical and chemical gel types can each be used as the electrolyte of a lithium secondary battery because both have ion conductivity of 2 to 3 mS/cm. However, a lithium secondary battery comprising the physical gel has a problem in that, if the temperature of the battery increases, the polymer that constitutes the physical gel dissolves in the organic electrolyte and is apt to be liquidized. This causes the positive and negative electrodes to short circuit.

On the other hand, the lithium secondary battery comprising the chemical gel has problems in that any polymerization initiator that does not react has a negative influence on the charge and discharge reactions of the battery. Further, gas is produced as a result of the reaction of the polymerization initiator. In addition, the polymer electrolyte does not form because of insufficient polymerization of the monomer.

Also, the negative electrode of the lithium secondary battery is apt to decompose the electrolyte during charging. The decomposition of the electrolyte decreases the battery performance, especially the capacity, retention characteristics of the battery, cycle life characteristics, low temperature characteristics, and other similar properties. Therefore, it is important to restrain the decomposition reaction of the electrolyte with the surface of the negative electrode to improve the above-mentioned battery characteristics.

A great deal of research has been undertaken regarding solvents that can restrain the decomposition reaction of the electrolyte. When selecting a solvent, such factors as solubility of the electrolyte support salt, reactivity with the positive electrode, ion conductivity, cost, etc., are considered.

Non-aqueous solvents are regarded as preferable solvents that meet the above-mentioned criteria. The preferable non-aqueous solvents comprise ethylene carbonate, butylenes carbonate, dimethyl carbonate, methylethyl carbonate, diethyl carbonate, γ-butyrolactone, propionic acid methyl, propionic acid butyl, propionic acid ethyl, etc., and a mixture thereof.

In addition, several research projects dealing with restraining the decomposition reaction of the electrolyte by forming a film on the surface of the negative electrode in order to increase the battery performance are being undertaken.

SUMMARY OF THE INVENTION

It is an object of the present invention to provide a polymer electrolyte that does not dissolve at high temperature and can stably exist in the battery.

It is another object to provide a lithium secondary battery having good performance comprising the polymer electrolyte of which the decomposition reaction is restrained and the quantity of the gas coming into existence is small.

Additional objects and advantages of the invention will be set forth in part in the description which follows and, in part, will be obvious from the description, or may be learned by practice of the invention.

In order to achieve these and other objects, an embodiment of the present invention provides a gel-forming polymer electrolyte comprising a gel-forming compound connected by a metal cation and an organic electrolyte of a lithium salt and aprotic solvent.

Another embodiment of the present invention, a gel-forming polymer electrolyte comprises at least one aziridine ring-containing compound selected from Formulas 1 to 4 and an organic electrolyte of a lithium salt and an aprotic solvent, where Formula 1 is

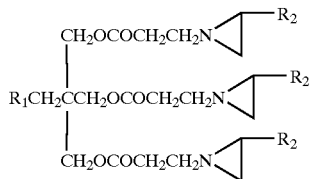

wherein $R_1$ is H, $CH_3$ or OH, and $R_2$ is H or $CH_3$,

Formula 2 is

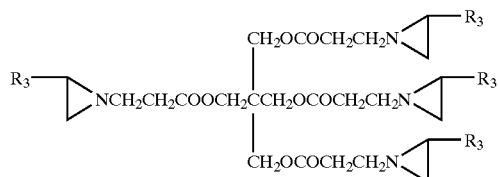

wherein $R_3$ is H or $CH_3$,

Formula 3 is

wherein $n_1$ is 0 to 10, and

Formula 4 is

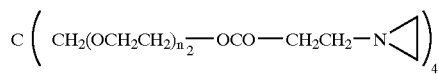

wherein $n_2$ is 0 to 10.

According to a further embodiment of the present invention, a lithium secondary battery includes the gel-forming polymer electrolyte.

BRIEF DESCRIPTION OF THE DRAWINGS

A more complete appreciation of the invention, and many of the attendant advantages thereof, will be readily apparent and more readily appreciated as the same becomes better understood by reference to the following detailed description when considered in conjunction with the accompanying drawings, wherein:

FIGS. 2A and 2B show another microstructure of the polymer electrolyte of an embodiment of the present invention;

FIG. 13 is a graph exhibiting other cycle life characteristics of the lithium secondary battery comprising non-gelated electrolyte comprising TAZO or TAZM.

DETAILED DESCRIPTION OF THE EMBODIMENTS

Figures 1A, 1B:
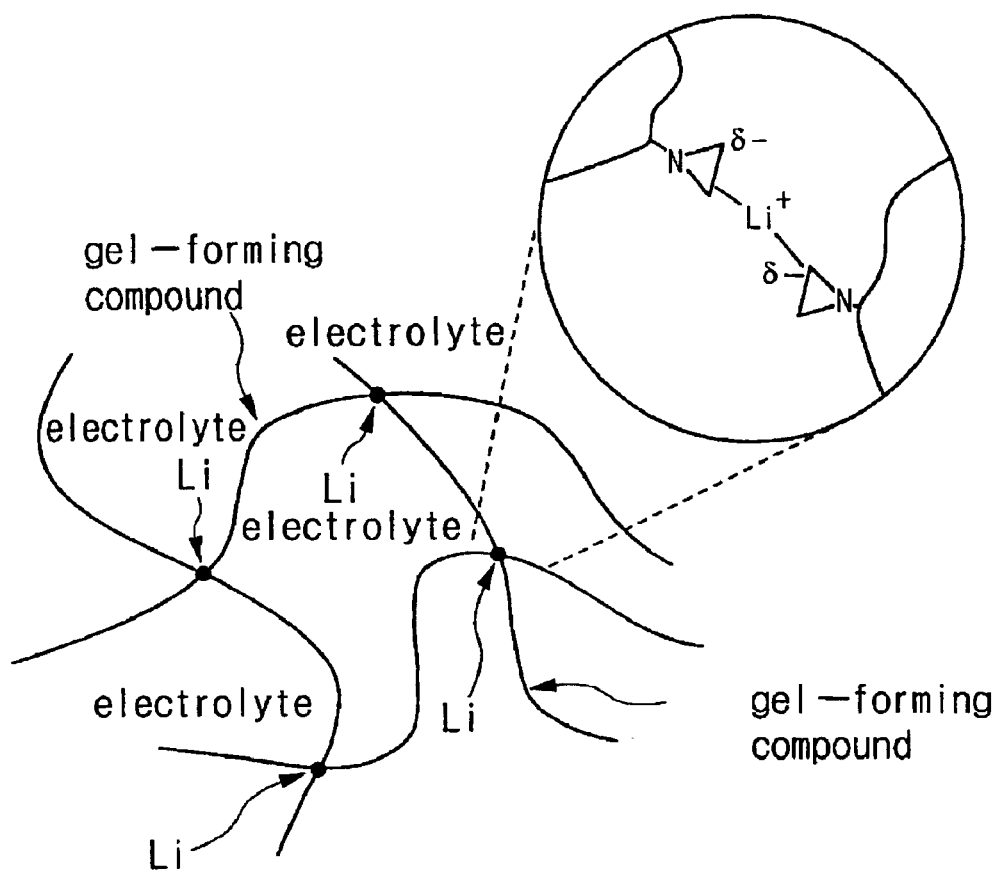
FIGS. 1A and 1B show a microstructure of an embodiment of the polymer electrolyte of the present invention.

Reference will now be made in detail to the present preferred embodiments of the present invention, examples of which are illustrated in the accompanying drawings and specific Examples, wherein like reference numerals refer to the like elements throughout. The embodiments are described below in order to explain the present invention by referring to the figures and specific Examples.

The polymer electrolyte of the present invention comprises a gel-forming polymer electrolyte. The gel forming polymer comprises a gel-forming compound connected with metal cations, and an organic electrolyte of a lithium salt and an aprotic solvent. The polymer electrolyte of an embodiment of the present invention is formed by simply mixing and gelating the gel-forming compound and the organic electrolyte so there is no fear of insufficient polymerization and a production of gas. Therefore, the polymer electrolyte is produced that is stable at high temperatures.

In addition, the decomposition reaction of the electrolyte on the surface of the negative electrode decreases at an initial charge because a film is formed on the surface of the negative electrode during the gel-forming operation. Therefore, the quantity of the gas produced decreases, the electrolyte does not deteriorate, the charge and discharge capacity of the lithium secondary battery does not decrease, the cycle life characteristics increase, and the shape of the battery does not deform.

The gel-forming compound connected to metal cations according to an embodiment of the invention is selected from a monomer and a polymer, and the metal cations are selected from alkali metal cations and alkali earth metal cations, and in particular lithium ions, sodium ions, potassium ions, calcium ions, and other similar ions.

The gel-forming polymer electrolyte is a nitrogen compound of which the nitrogen has a lone electron pair according to an embodiment of the invention.

It is preferable that the gel-forming compound is an aziridine ring-containing compound. The aziridine ring-containing compound is represented by Formulas 1 to 4.

Formula 1 is

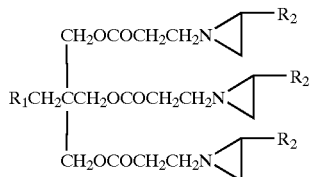

wherein $R_1$ is H, $CH_3$ or OH, and $R_2$ is H or $CH_3$,

Formula 2 is

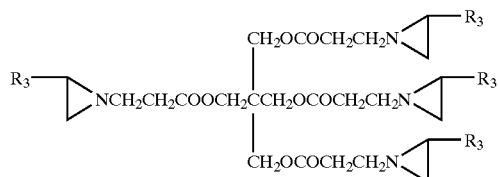

wherein $R_3$ is H or $CH_3$,

Formula 3 is

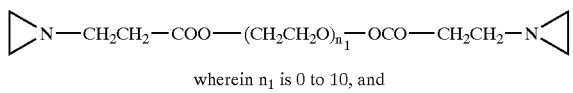

wherein $n_1$ is 0 to 10, and

Formula 4 is

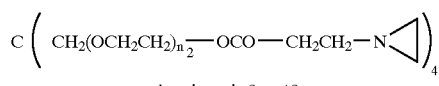

wherein $n_2$ is 0 to 10.

It is more preferable that the polymer electrolyte comprises the aziridine ring-containing compound of the Formula 1 and/or 2 to which the aziridine ring-containing compound of the Formula 3 and/or 4 is added.

The gel-forming compound blends with the organic electrolyte, and therefore it easily gelates. As a result, a polymer electrolyte made of a reasonably stable gel forms.

The aprotic solvent of the polymer electrolyte is selected from the group consisting of ethylene carbonate, butylene carbonate, propylene carbonate, γ-butyrolactone, dimethyl carbonate, methylethyl carbonate, diethyl carbonate, and a mixture thereof according to an embodiment of the invention.

Since the polymer electrolyte of the present invention comprises the aprotic solvent and can form a stable polymer electrolyte with the gel-forming compound, the ion conductivity of the polymer electrolyte increases.

The lithium salt of an embodiment of the present invention is selected from the group consisting of $LiPF_6$, $LiBF_4$, $LiSbF_6$, $LiClO_4$, $LiCF_3SO_3$, $Li(CF_3SO_2)_2N$, $LiC_4F_9SO_3$, $LiAlO_4$, $LiAlCl_4$, $LiN(C_xF_{2x+1}SO_2)(C_yF_{2y+1}SO_2)$ (wherein x and y are natural numbers), and a mixture thereof.

Since the polymer electrolyte comprises the lithium salt and can form a stable polymer electrolyte with the gel-forming compound, the ion conductivity of the polymer electrolyte increases.

A concentration of the lithium salt is 0.5 to 2.0 mol/M according to an embodiment of the invention. If the concentration of the lithium salt is 0.5 to 2.0 mol/M, the ion conductivity of the polymer electrolyte increases and, therefore, the high rate discharge characteristics increase.

A quantity of the gel-forming compound is 0.2 to 20 wt % of the overall polymer electrolyte according to an embodiment of the invention, and preferably 0.5 to 10 wt % of the overall polymer electrolyte. If the quantity of the gel-forming compound is 0.2 to 20 wt % of the overall polymer electrolyte, the lithium salt is not too tightly bonded to the gel-forming compound, and therefore the ion conductivity of the polymer electrolyte increases.

Hereinbelow, the gelation procedure of the polymer electrolyte of an embodiment of the present invention is explained using the aziridine ring-containing compound as a gel-forming compound by way of example.

Gelation occurs by the coordination of several of the aziridine rings of the aziridine ring-containing compound to the lithium ions of the lithium salt. Also, the polymer of the gel-forming compound forms by opening the aziridine rings, and at the same time, the impregnation of the organic electrolyte into the polymer occurs.

In addition, the lithium secondary battery of an embodiment of the present invention comprises a polymer electrolyte. The polymer electrolyte of an embodiment of the present invention comprises the gel-forming polymer electrolyte comprising a gel-forming compound connected with the metal cations and the organic electrolyte of the lithium salt and the aprotic solvent.

The aziridine ring-containing compound shown by Formulas 1 to 4 is selected as the gel-forming compound. The aziridine ring-containing compound shown by Formula 1 comprises three aziridine rings made up of two carbon atoms and one nitrogen atom, and the $R_2$ groups are respectively connected to the three aziridine rings. The polymer electrolyte forms by the coordination of the aziridine rings to the lithium, or by the polymerization of the aziridine ring-containing compound with another gel-forming compound by opening the aziridine rings.

The number of aziridine rings in the aziridine ring-containing compound is more than 1 according to an embodiment of the invention, and preferably, more than 2. If the number of aziridine rings in the aziridine ring-containing compound is more than 2, the part that coordinates with the lithium increases and a complex cross-linked network easily forms.

Gel easily forms by mixing the gel-forming compound with the organic electrolyte, thereby forming a polymer electrolyte made up of a reasonably stable gel.

FIGS. 1A and 1B show the shape of a polymer electrolyte with the coordination of the aziridine rings to the lithium ions. As shown in FIGS. 1A and 1B, several anionic aziridine rings attach to the cationic lithium ions and an aziridine ring-containing compound polymer forms by coordination of the aziridine ring-containing compound and lithium ions through constant electricity, and the organic electrolyte impregnates into the polymer. Also, another aziridine ring of the gel-forming compound coordinates with other lithium ions, and therefore a complex cross-linked network forms.

Gel easily forms by mixing at least one aziridine ring-containing compound of the Formulas 1 to 4 with the organic electrolyte comprising the lithium ions, thereby forming a polymer electrolyte made up of a stable gel.

Also, if a lithium secondary battery comprises the compound of the at least one aziridine ring-containing compound of the Formulas 1 to 4 and an organic electrolyte comprising the lithium ions, a film made up of at least one aziridine ring-containing compound of the Formulas 1 to 4 forms on the surface of the negative electrode 10 at the initial charge.

Figure 11A:
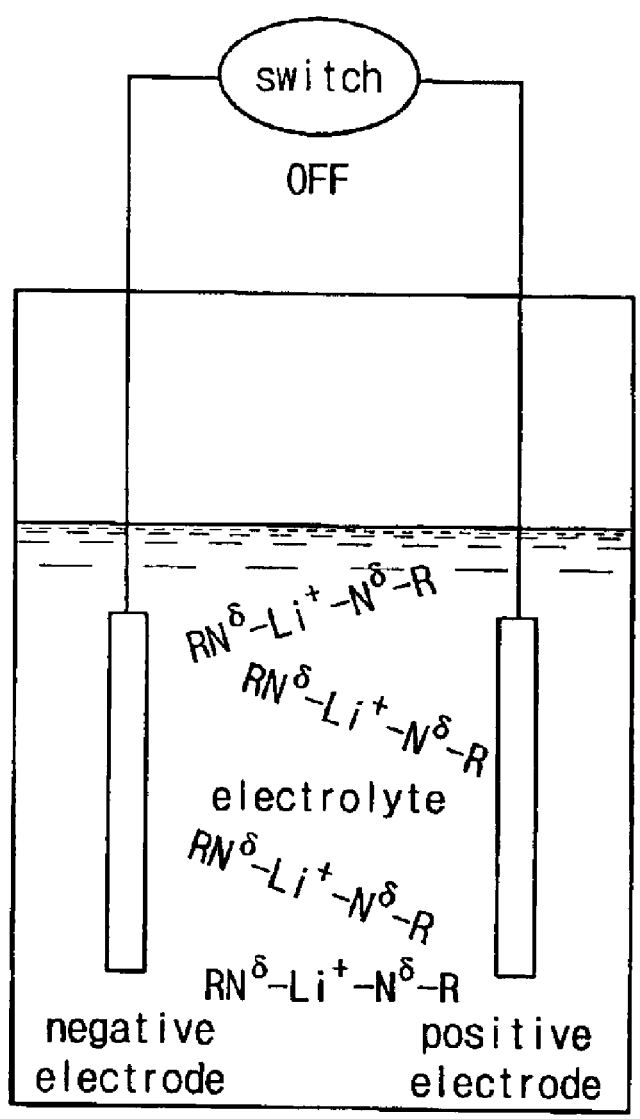
FIGS. 11A to 11C are diagrams exhibiting devices used to form a film on the surface of the negative electrode.
Figure 11B:
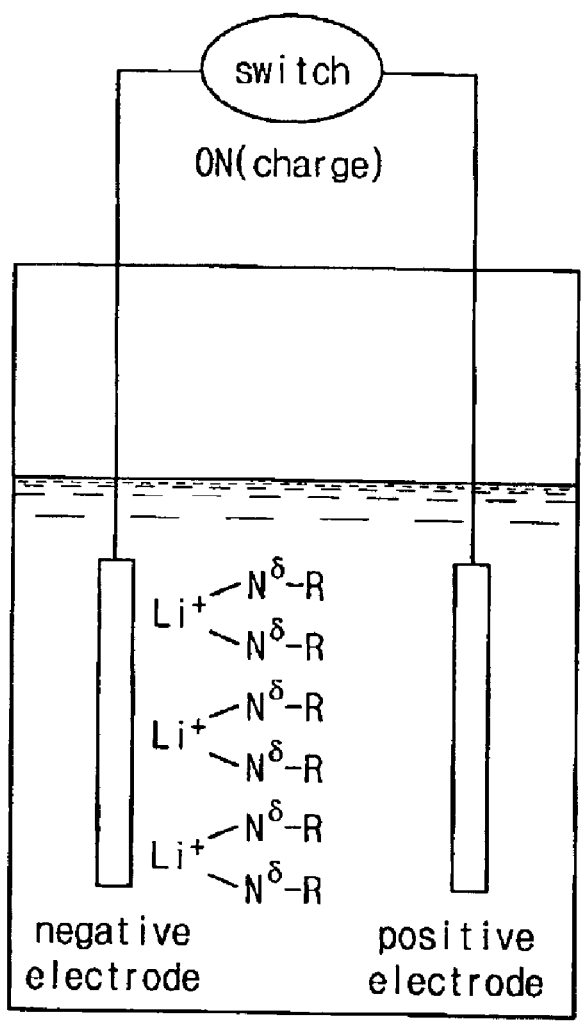
Figure 11C:
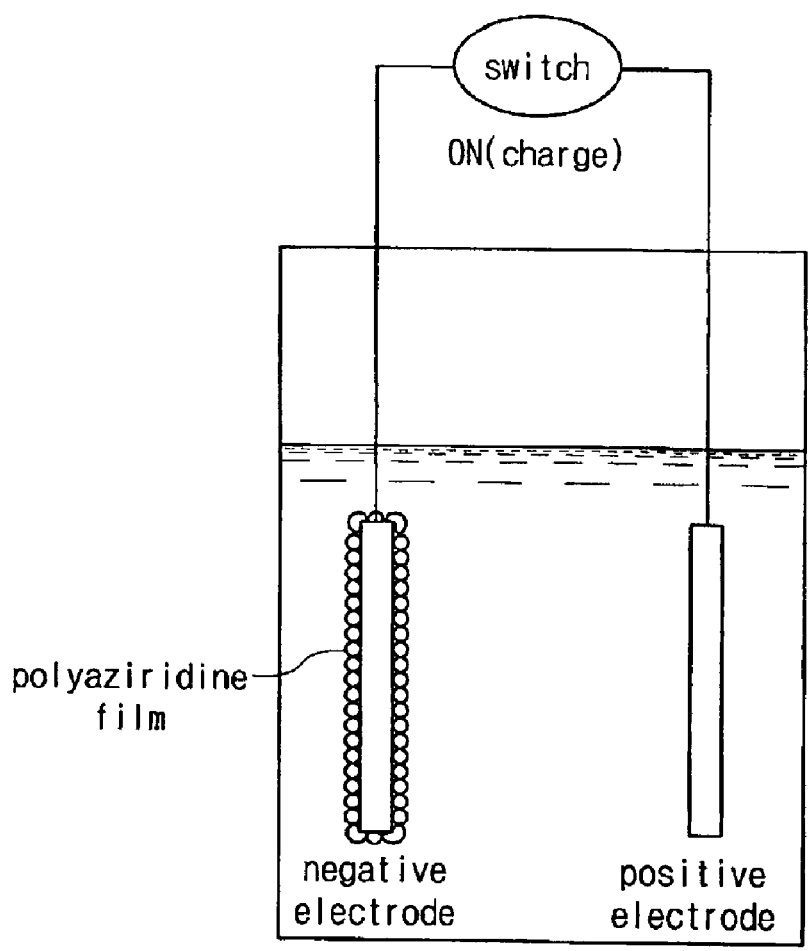

The procedure of the film formation proceeds as shown in FIG. 11A to FIG. 11C. As shown in FIG. 11A, before the initial charge, the lithium ions of the electrolyte and an overall or partial aziridine ring-containing compound exist in a state of a cross-linker (lithium-aziridine cross-linker network) network that cannot be called a complex cross-linker network. As shown in FIGS. 1A and 1B, the lithium-aziridine cross-linker network forms by coordination of the anionic aziridine rings with the cationic lithium ions.

As shown FIG. 11B, when the charge is initiated, the cationic lithium ions approach the anionic nitrogen ions by constant electricity, and the lithium-aziridine cross-linker network adheres to the surface of the negative electrode 10. Therefore, the concentration of the aziridine ring-containing compounds increases.

A lithium ion detaches from the ion cross-linking of the aziridine ring, and the negative electrode 10 absorbs the detached lithium ion. Polymerization is initiated by the opening of the rest of the aziridine rings, and as a result, a film forms as shown in FIG. 11C. The formed film is anionic, and therefore the formed film can carry only cations. The electrolyte does not come into contact with the negative electrode 10 directly, so the electrolyte does not decompose.

A perfectly gelated electrolyte before the initial charge has a difficult time forming a film because the quantity of the lithium-aziridine cross-linker network is not sufficient for film-forming. Therefore, if the quantity of the aziridine ring-containing compound of the electrolyte is high and the gelation reaction finishes before the initial charge, the decomposition of the electrolyte on the surface of the negative electrolyte 10 is not restrained.

A quantity of the aziridine ring-containing compound is 0.2 to 20 wt % of the polymer electrolyte according to an embodiment of the invention, and preferably 0.5 to 10 wt %. If the quantity of the aziridine ring-containing compound is less than 0.2 wt %, it is difficult for the polymer electrolyte to gelate and the decomposition of the electrolyte is not restrained because the aziridine ring-containing compound does not form a film on the surface of the negative electrolyte 10. If the quantity of the aziridine ring-containing compound is over 20 wt %, the quantity of the gel-forming compound is high and the lithium ions bond to the aziridine ring-containing compound and therefore the ion conductivity decreases. Therefore, when the quantity of the aziridine ring-containing compound is 0.2 to 20 wt %, the lithium ions are not bonded to the aziridine ring-containing compound and therefore the ion conductivity increases.

The degree of gel forming depends on the kind of aziridine ring-containing compound and the gelation time. In addition, the degree of film-forming depends on the kind of aziridine ring-containing compound and the charge conditions at the initial charge. Therefore the ideal quantity of the aziridine ring-containing compound depends on the gel forming, the film forming, or both the gel forming and the film forming.

In addition, FIGS. 2A and 2B show the polymerization by opening of the aziridine rings. The polymerization can be seen in the partial polymer electrolyte. As shown in FIGS. 2A and 2B, an aziridine ring of the gel-forming compound is connected to another aziridine ring-containing compound by opening of the aziridine rings. The lithium ions or the hydrogen ions mixed in the gel-forming compound or organic electrolyte accelerate the opening of the aziridine rings.

The polymer electrolyte of an embodiment of the present invention has a complex cross-linker network polymer structure because of the opening of the aziridine rings, and it has an impregnated organic electrolyte structure in the cross-linker network polymer.

A major portion of the polymer electrolyte is the coordination structure of the aziridine rings and the lithium ions. The rest of the polymer electrolyte has the polymer structure formed by opening of the aziridine rings. The organic electrolyte is impregnated in the cross-linker network formed by the coordination of the aziridine rings and the lithium or is formed by the opening of the aziridine rings.

A gel-forming compound according to an embodiment of the invention is selected from the group consisting of the following Formulas 1 to 4 and a mixture thereof. A preferable gel-forming compound is a mixture of the aziridine ring-containing compounds of Formulas 1 and/or 2 and the Formulas 3 and/or 4.

Formula 1 is

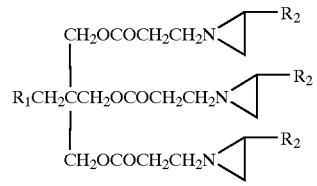

wherein $R_1$ is H, $CH_3$ or OH, and $R_2$ is H or $CH_3$,

Formula 2 is

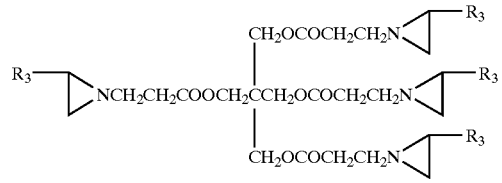

wherein $R_3$ is H or $CH_3$,

Formula 3 is

wherein $n_1$ is 0 to 10, and

Formula 4 is

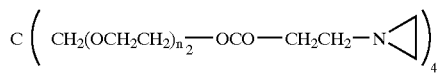

wherein $n_2$ is 0 to 10.

It is generally not preferable for $n_1$ and $n_2$ to be greater than 10 in the Formulas 3 and 4. When $n_1$ and $n_2$ are greater than 10, it is difficult for the Formulas 3 and 4 to gelate with the organic electrolyte because of an excessively high quantity of molecules.

The organic electrolyte according to an embodiment of the invention is a solution of the aprotic solvent and lithium salt. The aprotic solvent is selected from the group consisting of ethylene carbonate, butylene carbonate, propylene carbonate, γ-butyrolactone, dimethyl carbonate, methylethyl carbonate, diethyl carbonate, and a mixture thereof according to an embodiment of the invention. Preferably, conventional non-aqueous electrolyte can be used.

Since the polymer electrolyte comprises the aprotic solvent and the polymer electrolyte of the present invention can form a stable polymer electrolyte with a gel-forming compound, the ion conductivity of the polymer electrolyte increases.

In addition, the lithium salt of an embodiment of the present invention is selected from the group consisting of $LiPF_8$, $LiBF_4$, $LiSbF_6$, $LiClO_4$, $LiCF_3SO_3$, $Li(CF_3SO_2)_2N$, $LiC_4F_9SO_3$, $LiAlO_4$, $LiAlCl_4$, $LiN(C_xF_{2x+1}SO_2)(C_yF_{2y+1}SO_2)$ (wherein x and y are natural numbers), and a mixture thereof. Since the polymer electrolyte comprising the lithium salt and the polymer electrolyte is a stable polymer electrolyte with a gel-forming compound, the ion conductivity of the polymer electrolyte increases.

A concentration of the lithium salt is 0.5 to 2.0 mol/M. If the concentration of the lithium salt is 0.5 to 2.0 mol/L, the ion conductivity of the polymer electrolyte increases and, therefore, the high rate discharge characteristics increase.

If the concentration of the lithium salt is less than 0.5 mol/L, the ion conductivity of the polymer electrolyte decreases. If the concentration of the lithium salt is over 2.0 mol/L, precipitation of the lithium salt occurs when the organic electrolyte is mixed with the gel-forming compound. Therefore, if the concentration of the lithium salt is 0.5 to 2.0 mol/L, the ion conductivity of the polymer electrolyte increases and therefore the high rate characteristics improve.

A quantity of the gel-forming compound is 0.2 to 20 wt % of the overall polymer electrolyte according to an embodiment of the invention, and more preferably 0.5 to 10 wt %. If the quantity of the gel-forming compound is 0.2 to 20 wt % of the overall polymer electrolyte, the lithium salt is not too tightly bonded to the gel-forming compound, and the ion conductivity of the polymer electrolyte increases. If the quantity of the aziridine ring-containing compound is less than 0.2 wt %, it is difficult for the polymer electrolyte to gelate and the decomposition of the electrolyte is not restrained because the aziridine ring-containing compound does not form a film on the surface of the negative electrolyte. If the quantity of the aziridine ring-containing compound is over 20 wt %, the quantity of the gel-forming compound is high and lithium ions are bonded to the aziridine ring-containing compound and therefore the ion conductivity decreases.

The degree of gel formation depends on the kind of aziridine ring-containing compound, the kind of organic electrolyte, and the gel-forming time. Also, the degree of the formation of the film depends on the kind of aziridine ring-containing compound, the kind of organic electrolyte, as well as the initial charge condition. Therefore, the ideal quantity of the aziridine ring-containing compound depends on the gel forming, the film forming, or both.

The polymer electrolyte of an embodiment of the present invention is gelated by mixing the gel-forming compound and the organic electrolyte, and thinner lithium secondary batteries of various types can be manufactured using the polymer electrolyte.

The gel-forming compound coordinates the lithium ions through part or all of the gel. Also, the organic electrolyte impregnates the polymer formed by the ring opening of the gel-forming compound into part or all of the gel. In addition, the gel can be formed with several kinds of gel-forming compounds.

To determine the quantity of the aprotic solvent, the quantity of the lithium salt and the gel-forming compound is subtracted from the quantity of the polymer electrolyte.

The polymer electrolyte of an embodiment of the present invention is formed by mixing and gelating the gel-forming compound and the organic electrolyte, so there is no fear of insufficient polymerization and production of gas, and therefore a polymer electrolyte is produced that is stable at high temperature.

Figure 4:
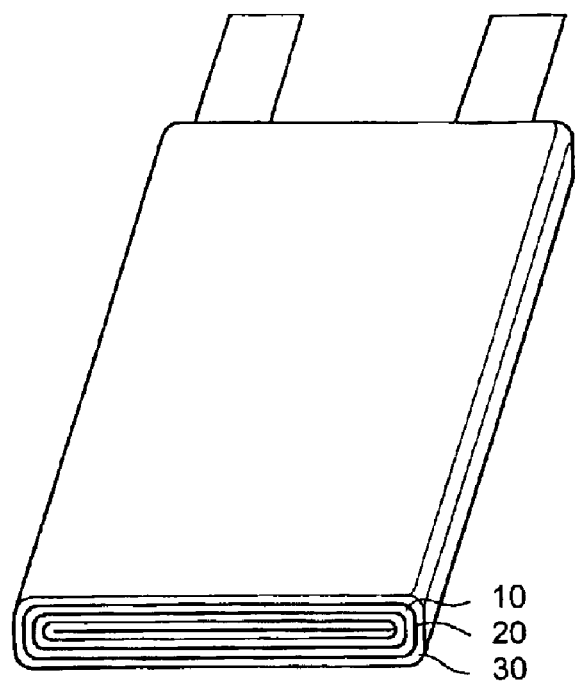
FIG. 4 is a schematic view of a gel polymer battery according to an embodiment of the present invention.

According to another embodiment of the invention, a lithium secondary battery as shown in FIG. 4 includes positive and negative electrodes 30 and 10 comprising corresponding positive and negative active materials that can reversibly intercalate and deintercalate lithium ions. The positive active material used in the positive electrode 30 is selected from $LiMn_2O_4$, $LiCoO_2$, $LiNiO_2$, $LiFeO_2$, $V_2O_5$, TiS, MoS, organodisulfide compounds, organopolysulfide compounds, and other similar compounds that can reversibly intercalate and deintercalate lithium ions. The negative active material used in the negative electrode 10 is selected from artificial graphite, natural graphite, graphitized carbon fiber, non-crystalline carbon, and other similar materials that can reversibly intercalate and deintercalate lithium ions. The metal lithium is preferably used as a negative active material.

The positive and negative electrodes 30 and 10 are manufactured through the following procedures according to an embodiment of the invention: making a slurry by separately mixing the positive and negative active materials, a binder, and a conductive agent; spraying the slurry having the positive and negative materials on corresponding current collectors made of metal foil or a metal network; and making the positive and negative electrodes in a sheet form. It is understood that other conventional positive and negative electrodes 30 and 10 can be used as the positive and negative electrode in the present invention.

The lithium secondary battery is fabricated by assembling the positive and negative electrodes 30 and 10 and inserting the polymer electrolyte 20 therebetween. However, it is understood that other fabrication methods can be used.

The polymer electrolyte 20 functions as an electrolyte of lithium ions and as a separator of the positive and negative electrodes. Also, a conventional separator 20 in which the polymer electrolyte is impregnated can be used in another embodiment of the present invention.

The polymer electrolyte of an embodiment of the present invention is formed by mixing the organic electrolyte and the gel-forming compound and leaving the mixture at 10 to 75° C. for 2 to 150 hours.

For the fabrication of a coin-type lithium secondary battery according to a further embodiment of the invention, a positive electrode 30, a polypropylene porous separator 20, and packing are inserted into a positive electrode case of a coin-type battery. The polymer electrolyte solution is inserted therein, and the case is then sealed with a negative electrode 10 and a negative electrode cover. The battery is left at room temperature for 24 hours. The diameter and height of the coin-type battery are 20 mm and 16 mm, respectively.

The polymer electrolyte of an embodiment the present invention is formed by mixing and gelating the gel-forming compound and organic electrolyte, so there is no fear of insufficient polymerization and production of gas, and therefore a polymer electrolyte that is stable at high temperature is produced. Thinner lithium secondary batteries of various types can be manufactured because the state of the electrolyte is a gel.

Also, a film made up of the gel-forming compound forms on the surface of the negative electrode 10 of the lithium secondary battery of the present invention. The decomposition reaction of the electrolyte on the surface of the negative electrode 10 decreases and the deterioration of the electrolyte is prevented because of the film made up of the gel-forming compound that forms on the surface of the negative electrode 10, and the quantity of the gas produced decreases. Therefore a decrease of the charge and discharge capacity is prevented, and the cycle life characteristics of the lithium secondary battery improve and a change of the shape of the lithium secondary battery is prevented. Also, the storage characteristics at high temperatures improves because the decomposition of the electrolyte is restrained by the organic film formed on the surface of the negative electrode 10.

The lithium secondary batteries of the present invention can be classified into three types. The characteristics of the first type of lithium secondary battery are such that the electrolyte is gelated by the aziridine ring-containing compound and the organic electrolyte, but a film does not form on the surface of the negative electrode 10. The characteristics of the second type lithium secondary battery are such that the electrolyte is not gelated, but a film made up of aziridine ring-containing compound forms on the surface of the negative electrode 10. The characteristics of the third type lithium secondary battery are such that the electrolyte is gelated by the aziridine ring-containing compound and the organic electrolyte, and a film forms on the surface of the negative electrode.

To select a preferable battery from among the three types, the kind and the quantity of the aziridine ring-containing compound, the kind of the organic electrolyte, the charge time and other similar factors should be considered. The higher the quantity of the aziridine ring-containing compound, the greater the tendency to become the first type of battery (i.e., one that is gelated without a film). The lower the quantity of the aziridine ring-containing compound, the greater the tendency to become the second type of battery (i.e., one having a film but which is not gelated). Also, if the initial charge time is controlled by use of electrolyte material of which the quantity of the aziridine ring-containing compound is reasonably high, the third type lithium secondary battery can be prepared (i.e., one that has a film and is gelated).

In the three types of batteries, the aziridine ring-containing compound of the Formulas 1 to 4 is largely consumed in the gelation, the viscidity-forming, and the film-forming. The remaining quantity is small as is attested to in the Formulas 1 to 4.

When a lithium secondary battery of the present invention is manufactured as a gel polymer battery, it is preferable that the gelation progresses in the battery after the electrolyte material is inserted into the battery container and the electrodes are fabricated. For example, a gel polymer lithium secondary vortex-type battery is fabricated by the following procedures according to another embodiment of the invention: inserting a separator between positive and negative electrodes 30 and 10 as shown in FIG. 4; fabricating a battery by rolling; inserting the battery into an aluminate battery container; inserting the electrolyte material into the battery container and sealing the battery container; and leaving the battery container until the electrolyte is gelated.

In addition, a gel polymer lithium secondary coin-type battery is fabricated by the following procedures: inserting a positive electrode 30, a separator 20, and packing into a positive electrode case; inserting the mixed electrolyte material sealing the entrance of the positive electrode case with a negative electrode 10 and a negative electrode cover; and leaving the positive electrode case until the electrolyte is gelated.

As shown above, the lithium secondary battery of the present invention shows good battery characteristics because the electrolyte material gelates after the electrolyte material is inserted into the inner space of the battery. As long as the initial charge progresses with the formation, the aziridine film forms on the surface of the negative electrode 10 of the lithium secondary battery. It is necessary that the aziridine ring-containing compound, which is a necessary component in the film of the electrolyte, exists in the electrolyte material at the initial charge.

To produce the lithium secondary battery of the present invention, an aziridine ring-containing compound that is not gelated is necessary, as it is difficult for an aziridine ring-containing compound that has previously been gelated to form the film. Therefore, in fabricating a lithium secondary battery of which the negative electrode 10 is covered with the film, the preferable quantity of the aziridine ring-containing compound is small such that the aziridine ring-containing compound does not gelate. In addition, when a fairly high quantity of the aziridine ring-containing compound is used as the electrolyte material, the film forms on the surface of the negative electrode 10 if the initial charge progresses before the gelation entirely is completed.

Among the three types of batteries, the electrolyte of the first and third types of batteries gelates, which allows for the manufacture of thin batteries of various configurations. Also, the second and third types of batteries, in which the surface of the negative electrode 10 has the film, are the batteries in which the decomposition reaction of the negative electrode is restrained.

The following examples are presented to better illustrate the invention, but are not to be construed as limiting the invention to the specific embodiments disclosed.

EXAMPLE 1 THROUGH 10

TAZM (trimethylolpropane-tri-β-aziridinylpropionate) as shown in the following Formula 5 was prepared as the gel-forming compound. The TAZM is the material of Formula 1 wherein $R_1$ is $CH_3$, and $R_2$ is H.

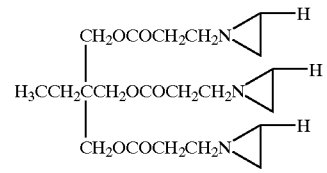

Formula 5

Samples 1 to 10 comprising TAZM at 2.5 to 10 wt % were fabricated by adding the TAZM to the following three kinds of organic electrolytes, sufficiently agitating the Samples 1 to 10, and then leaving the Samples 1 to 10 under various conditions. The following Table 1 shows the test results of the ion conductivity of the Samples 1 to 10.

The three kinds of organic electrolytes are as follows:

Organic electrolyte 1: EC:DMC:DEC=3:3:1 (volume ratio);

Organic electrolyte 2: EC:DMC:DEC=3:3:1 (volume ratio)+$LiPF_6$(1.0 mol/L); and

Organic electrolyte 3: EC:DMC:DEC=3:3:1 (volume ratio)+$LiPF_6$(1.3 mol/L), where EC means Ethylene Carbonate, DMC means Dimethyl Carbonate, and DEC means Diethyl Carbonate.

Also, the leaving conditions were three kinds: one was the condition of leaving for 15 hours at room temperature (room temperature, 15 hours), the second was the condition of leaving for 4 hours at 50° C. after leaving for 15 hours at room temperature (50° C., 4 hours), and the third was the condition of leaving for 150 hours at room temperature (room temperature, 150 hours).

TABLE 1

| Sample | The quantity of the Organic electrolyte TAZM | The kind of the organic electrolyte | room temperature 15 hours | | 50° C., 4 hours | | room temperature 150 hours | |
|---|---|---|---|---|---|---|---|---|
| | | | The condition of gel | Ion conductivity | The condition of gel | Ion conductivity | The condition of gel | Ion conductivity |
| Sample 1 | 2.5 wt % | 97.3 wt % | Organic electrolyte 1 | Liquid | — | Liquid | — | Liquid | — |
| Sample 2 | 5.0 wt % | 95.0 wt % | Organic electrolyte 1 | Liquid | — | Liquid | — | Liquid | — |
| Sample 3 | 10 wt % | 90.0 wt % | Organic electrolyte 1 | Liquid | — | Liquid | — | Liquid | — |
| Sample 4 | 20 wt % | 80.0 wt % | Organic electrolyte 1 | Liquid | — | Liquid | — | Liquid | — |
| Sample 5 | 2.5 wt % | 97.3 wt % | Organic electrolyte 2 | Liquid | — | Liquid | — | Liquid | — |
| Sample 6 | 5.0 wt % | 95.0 wt % | Organic electrolyte 2 | Liquid | — | Liquid | — | Gel (colorless) | 4.0 mS/cm |
| Sample 7 | 10 wt % | 90.0 wt % | Organic electrolyte 2 | Gel (colorless) | 4.6 mS/cm | Gel (colorless) | 3.9 mS/cm | Gel (colorless) | 3.9 mS/cm |
| Sample 8 | 2.5 wt % | 97.3 wt % | Organic electrolyte 3 | Liquid | — | Liquid | — | Liquid | — |
| Sample 9 | 5.0 wt % | 95.0 wt % | Organic electrolyte 3 | Liquid | — | Liquid | — | Gel (colorless) | 3.9 mS/cm |
| Sample 10 | 10 wt % | 90.0 wt % | Organic electrolyte 3 | Liquid (high viscosity) | — | Liquid (colorless) | 3.7 mS/cm | Gel (colorless) | 3.8 mS/cm |

As shown in Table 1, the Samples 1 to 4 that did not include the $LiPF_6$ were not gelated under any leaving conditions and remain as a liquid. Also, among the Samples 5 to 7 comprising the organic electrolyte 2, the Sample 7 was gelated under the leaving condition of room temperature, 15 hours, and the Sample 6 was gelated under the condition of room temperature, 150 hours. Further, among the Samples 8 to 10 comprising the organic electrolyte 3, Sample 9 was gelated under the leaving condition of 50° C. for 4 hours, and Sample 10 was gelated under the leaving condition of room temperature for 150 hours.

The samples that did not include the lithium salt were not gelated, and the samples comprising the lithium salt were more likely to gelate according to the increased concentration of the TAZM. Also, the ion conductivity of the gelated Samples 6, 7, 9, and 10 was 2 to 4 mS/cm, and therefore the ion conductivity of the gelated Samples 6, 7, 9, and 10 was better suited for use in the lithium secondary battery.

EXAMPLE 11 TO 12

TAZM (trimethylolpropane-tri-β-aziridinylpropionate) as shown in the following Formula 5, and Me-TAZM as shown in the following Formula 6, were prepared as the gel-forming compounds. The Me-TAZM was the material of Formula 1 wherein $R_1$ and $R_2$ are all $CH_3$

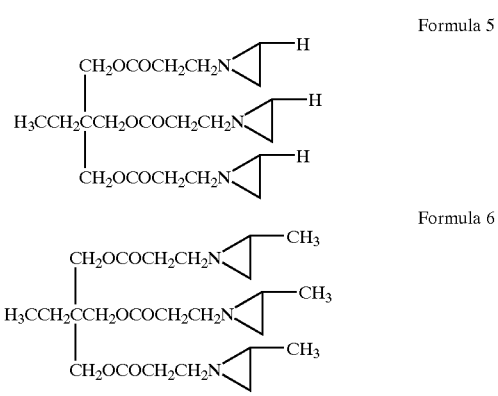

Samples 11 and 12 comprising the TAZM or the Me-TAZM at 10 wt % were fabricated by the following procedures: adding the TAZM or the Me-TAZM to the organic electrolyte 2, sufficiently agitating Samples 11 and 12, and leaving the samples under the condition of room temperature for 15 hours. The following table 2 shows the test results of the ion conductivity of Samples 11 and 12.

TABLE 2

| Sample | Gel-forming compound | Ion conductivity |
| --- | --- | --- |
| Sample 11 | TAZM | 3.0 mS/cm |
| Sample 12 | Me-TAZM | 2.5 mS/cm |

As shown in table 2, Samples 11 and 12 were gelated under the leaving condition of room temperature for 15 hours. Also, the ion conductivity of the gelated Samples 11 and 12 was 2.5 to 3 mS/cm, and therefore the ion conductivity of the gelated Samples 11 and 12 were better suited for use in the lithium secondary battery.

If organic electrolytes comprising the lithium salt and the aprotic solvent were added to the gel-forming compound (TAZM or Me-TAZM) of the present invention, a good ion conductivity polymer electrolyte was gained by the gelatin.

EXAMPLE 13

Example 13 reveals the discharge curve of the lithium secondary battery cell comprising the electrolyte of Sample 7. A coin-type battery cell was fabricated by the following procedures: inserting a positive electrode 30, a porous polypropylene separator 20, and packing into a positive electrode case; inserting the polymer electrolyte (Sample 7) into the positive electrode case; sealing the entrance of the positive electrode case with a negative electrode 10 and a negative electrode cover; and leaving the positive electrode case for 24 hours at room temperature. The diameter of the coin-type battery cell was 20 mm, and the height was 1.6 mm (CR2016).

Figure 3:
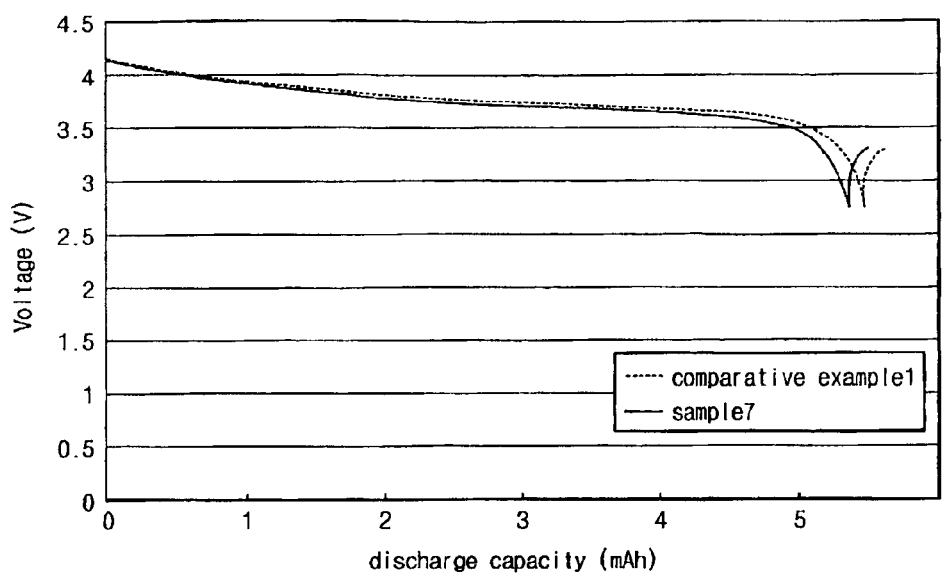
FIG. 3 is a discharge curve at 1 cycle after formation of the lithium secondary battery comprising the polymer electrolyte.

The charge condition was as follows: the battery cell was charged until the voltage reached 4.2V with a constant 0.2C current, and then it was charged for 9 hours at 4.2V. That is, the charge condition was a constant current-constant voltage charge. The discharge condition was as follows: the battery cell was discharged until the voltage reached 2.75V, with a constant 0.2C current. If a battery cell is charged and discharged under the above conditions, it is called formation. FIG. 3 shows the first cycle discharge curve of charge and discharge after formation under the above condition of formation.

Comparative Example 1

The coin-type lithium secondary battery cell of Comparative Example 1 was fabricated using organic electrolyte 2 instead of the polymer electrolyte (Sample 7), and the charge and discharge conditions of Comparative Example 1 were the same as in Example 1. FIG. 3 shows the first cycle discharge curve after formation under the same condition of formation as above.

As shown in FIG. 3, the lithium secondary battery cell comprising the polymer electrolyte of the present invention shows better discharge characteristics than the lithium secondary battery cell comprising the conventional organic electrolyte, because the voltage and discharge capacity almost do not vary.

EXAMPLE 14

Example 14 reveals the rate characteristics of the lithium secondary battery cell comprising the electrolyte comprising TAZM or Me-TAZM. A battery cell as shown in FIG. 4 was prepared as follows: a positive electrode 30 comprising $LiCoO_2$ as the positive active material, a negative electrode 10 comprising carbon as the negative active material, and a porous polypropylene separator 20 were rolled; and the positive and negative electrodes 30, 40 and the separator 10 were sealed in an aluminate battery cell container. The length of the battery cell was 62 mm, the breadth 35 mm, and the thickness 3.6 mm.

The gel polymer lithium secondary battery cell of Sample 13 was fabricated by the following procedures: a polymer electrolyte prepared by adding the TAZM at 10 wt % to organic electrolyte was inserted into the battery cell container; the mixture was agitated; the battery cell was sealed; and the sealed battery cell was left for 24 hours.

The electrolyte of Sample 14 was prepared by using Me-TAZM as the gel-forming compound instead of the TAZM. The organic electrolytes used in Samples 13 and 14 were the mixture of which $LiPF_6$ of 1.3 mol/L was added to the complex solvent of EC:DEC=3:7 (volume ratio).

Comparative Example 2

The lithium secondary battery cell of Comparative Example 2 was fabricated by the same method as in Example 14, except that neither the TAZM nor the Me-TAZM were used.

After formation of Example 14 and Comparative Example 2 and discharging them at a constant current, the discharge capacity was measured through a rate test. In the rate test, the condition of the constant current-constant voltage charge was as follows: the battery cell was charged until the voltage reached 4.2V with a constant 0.5C current, and then the battery cell was charged at 4.2V for 3 hours. The condition of constant current discharge entailed discharging the battery cell until the voltage of the battery cell reached 2.75V.

Figure 5:
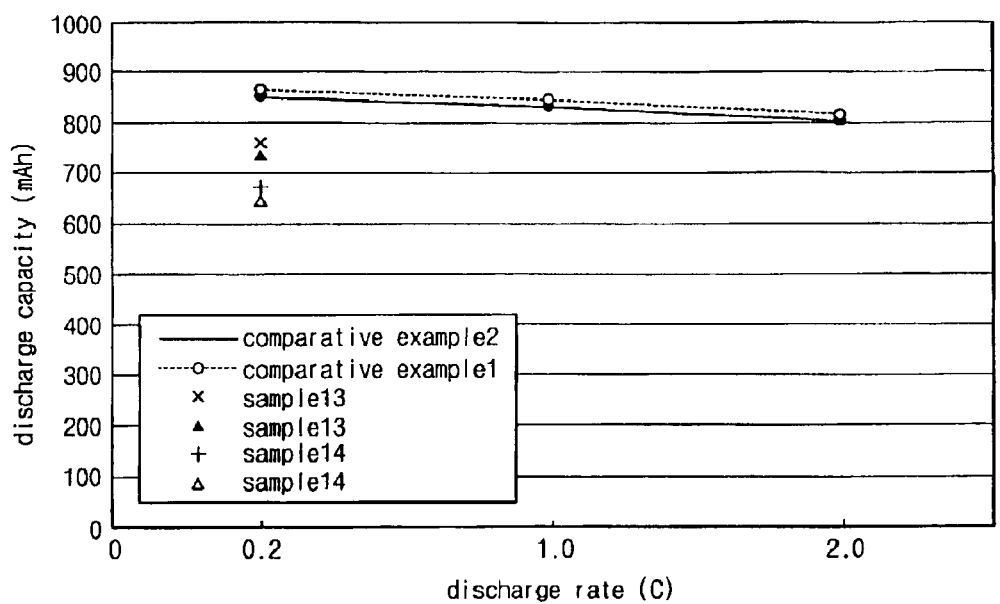
FIG. 5 is a graph exhibiting the relationship between a discharge rate and a discharge capacity of the lithium secondary battery comprising the embodiments of the polymer electrolyte of Samples 13 and 14.

FIG. 5 shows the results of the rate tests of the gel polymer lithium secondary battery cell of Samples 13 and 14 at a discharge rate of 0.2C. Also, FIG. 5 shows the results of the rate tests of the lithium secondary battery cell comprising the organic electrolyte of Comparative Example 2 at 0.2C, 1.0C, and 2.0C discharge rates. As shown in FIG. 5, the lithium secondary battery cells comprising the polymer electrolytes of Samples 13 and 14 show lower discharge capacities than the lithium secondary battery cell comprising the organic electrolyte of Comparative Example 2. However, the lithium secondary battery cell comprising the polymer electrolytes of Samples 13 and 14 show sufficient discharge capacities to be usable as lithium secondary battery cells. Also, FIG. 5 shows that the presence of the TAZM or the Me-TAZM in the battery cell does not have a negative influence on the rate characteristics.

EXAMPLE 15

Example 15 reveals the characteristics of the lithium secondary battery cell comprising electrolyte comprising TAZM. Battery cells such as that shown in FIG. 4 were prepared as follows: a positive electrode 30 comprising $LiCoO_2$ as the positive active material, a negative electrode 10 comprising carbon as the negative active material, and a porous polypropylene separator 20 were rolled for each battery cell and inserted into aluminate battery cell containers. The length of each battery cell was 62 mm, the breadth 35 mm, and the thickness 3.6 mm.

The gel polymer lithium secondary battery cells of Example 15 were fabricated as follows: polymer electrolytes prepared by adding the TAZM at 2, 5, 7.5, and 10 wt % to organic electrolyte were respectively inserted into the aluminate battery cell containers; and the mixtures were agitated and the battery cell containers were sealed and left for 24 hours. The organic electrolytes used in Example 15 were mixtures in which 1.3 mol/L of $LiPF_6$ were added to the complex solvent of EC:DEC=3:7 (volume ratio).

Also, the lithium secondary battery cell of a Comparative Example (TAZM 0 wt %) was fabricated as in Example 15, except that the TAZM was not used.

The lithium secondary battery cell comprising the TAZM at 2 wt % did not gelate after being left for 96 hours at room temperature, but the lithium secondary battery cell comprising the TAZM at 5 wt % gelated after being left for 96 hours. Also, the lithium secondary battery cell comprising the TAZM at 7.5 and 10 wt % gelated after being left for 24 hours at room temperature.

Figure 6:
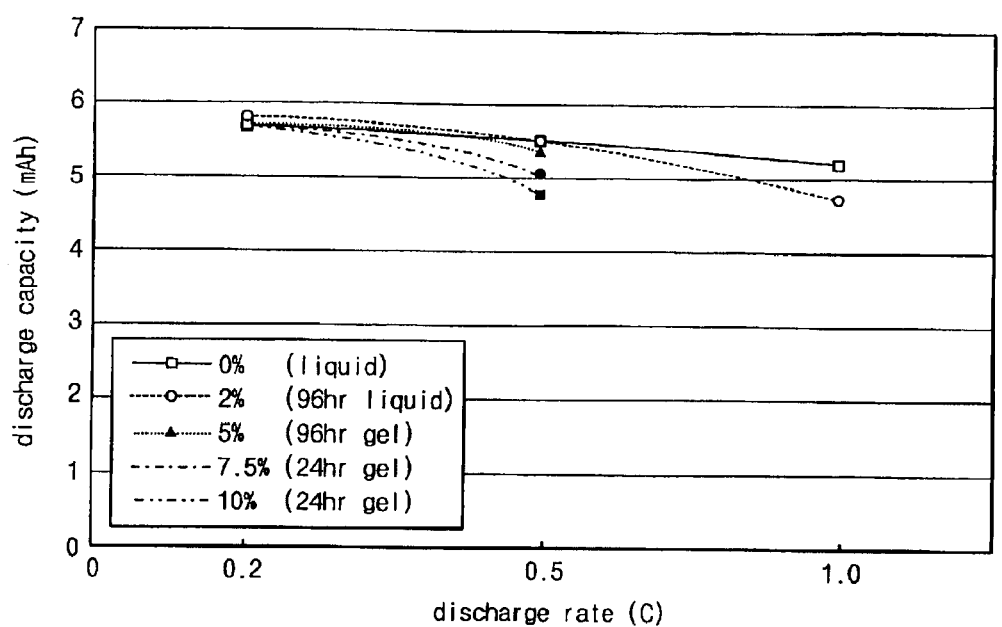
FIG. 6 is a graph exhibiting the relation of discharge rate and discharge capacity of the lithium secondary battery comprising a polymer electrolyte comprising TAZM at 0 to 10 wt %.

The rate tests of the lithium secondary battery cells after formation were done under the same test condition as in Example 14. FIG. 6 shows the results of the rate test at 0.2C, 0.5C, and 1.0C currents. As shown in FIG. 6, if the discharge rate increases, the discharge capacity decreases as the quantity of the TAZM increases. But at a discharge rate of 0.5C, there was no great difference between the lithium secondary battery cell comprising the TAZM and the lithium secondary battery cell not comprising the TAZM. Therefore, the lithium secondary battery cell of the present invention shows good rate characteristics. That is, the presence of the TAZM in the battery cell does not have a significant influence on the rate characteristics of the lithium secondary battery cell of the present invention.

EXAMPLE 16

Example 16 reveals the characteristics of the lithium secondary battery cell of the present invention according to the concentration of the lithium salt. Battery cells as shown in FIG. 4 were prepared as follows: a positive electrode 30 comprising $LiCoO_2$ as the positive active material, a negative electrode 10 comprising carbon as the negative active material, and a porous polypropylene separator 20 for each battery cell was rolled and inserted into aluminate battery cell containers. The length of each battery cell was 62 mm, the breadth 35 mm, and the thickness 3.6 mm.

Gel polymer lithium secondary battery cells of Sample 16 were fabricated by the following procedures: polymer electrolytes prepared by adding TAZM at 5 wt % to organic electrolytes, were inserted into each battery cell container, the mixtures were agitated, and the battery cell containers were sealed and left for 24 hours. The organic electrolytes used in Example 16 were mixtures in which $LiPF_6$ at 1.0, 1.3, and 1.5 mol/L was added to the complex solvent of EC:DEC=3:7 (volume ratio).

Also, the lithium secondary battery cell of a Comparative Example (TAZM 0 wt %) was fabricated as in Example 16 except that the TAZM was not used.

Figure 7:
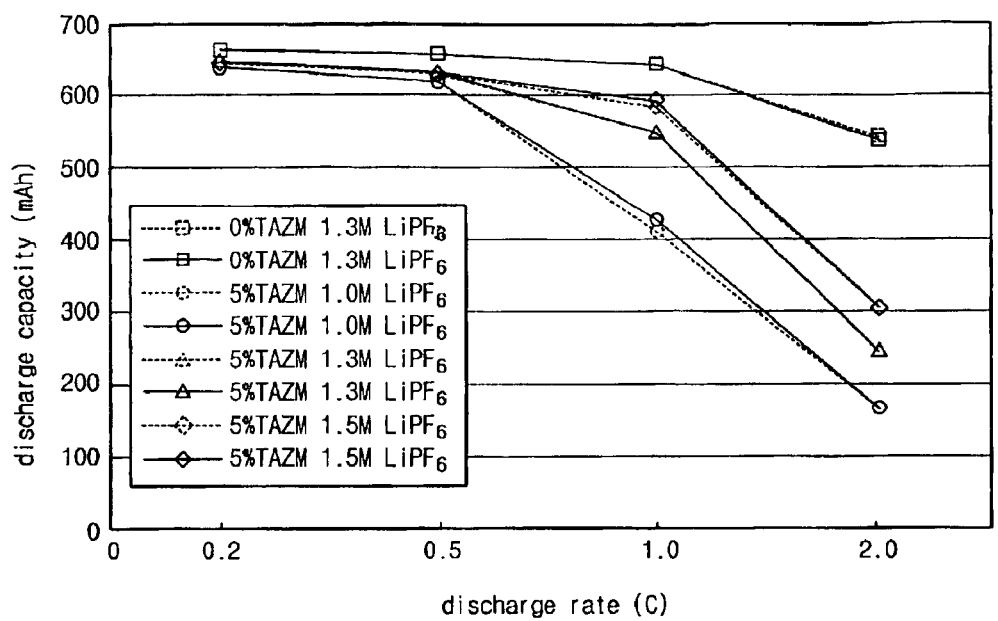
FIG. 7 is a graph exhibiting the relationship between a discharge rate and a discharge capacity of the lithium secondary battery comprising an organic electrolyte comprising $LiPF_6$ at 1.0 to 1.5 mol/L.

The rate tests of the lithium secondary battery cells after formation were done under the same test condition as in Example 14. FIG. 7 shows the results of the rate test at 0.2C, 0.5C, 1.0, and 2.0C. As shown in FIG. 7, if the discharge rate increases, the discharge capacity decreases as the concentration of the $LiPF_6$ decreases. The lithium secondary battery cell of the present invention shows a relatively high discharge capacity at a high rate of 2C as long as the concentration of the lithium salt is high.

EXAMPLE 17

Example 17 reveals the properties of the electrolyte comprising TAZO. A mixture of tetramethyloethane-tri-β-aziridinylpropionate as shown in the following Formula 7 and a compound of Formula 2 in which $R_3$ is H at a 25:75 volume ratio were prepared as the gel-forming compound. The above-mentioned mixture is called TAZO.

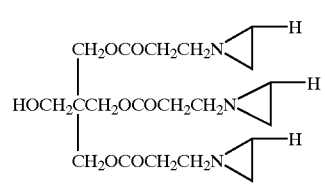

Formula 7

Electrolytes comprising the TAZO of 1, 2, 3, 5, and 10 wt % were prepared by adding the TAZO to the electrolytes and agitating them sufficiently, and leaving them at room temperature. The organic electrolytes used in Example 17 were mixtures in which 1.3 mol/L of $LiPF_6$ were added to a complex solvent of EC:DEC=3:7 (volume ratio). As a result, the electrolytes comprising the TAZO at 3, 5, and 10 wt % gelated within 15 hours at room temperature, and the electrolyte comprising TAZO at 2 wt % gelated after being left for 36 hours at room temperature. The electrolyte comprising the TAZO at 1 wt % became a viscous liquid after being left for 48 hours at room temperature. Therefore, it is known that an electrolyte comprising the TAZO at over 3 wt % can gelate.

If the electrolytes comprising gelated TAZO at over 3 wt % are left for 1 hour at 100° C., liquid does not exist in the electrolytes. From this, it is known that the electrolyte comprising TAZO at over 3 wt % forms a stable gel and is not liquidized at high temperatures.

EXAMPLE 18

Example 18 reveals the rate characteristics of the lithium secondary battery cell comprising TAZO. Battery cells as shown in FIG. 4 were prepared as follows: a positive electrode 30 comprising $LiCoO_2$ as the positive active material, a negative electrode 10 comprising carbon as the negative active material, and a porous polypropylene separator 20 were rolled for each battery cell and inserted into aluminate battery cell containers; polymer electrolytes prepared by adding the TAZO at 3, 4, and 5 wt % to the organic electrolyte were respectively inserted into each battery cell container; the mixtures were agitated; and the battery cell containers were sealed and left for 24 hours. The length of each battery cell was 62 mm, the breadth 35 mm, and the thickness 3.6 mm.

The organic electrolytes used in Example 18 were mixtures in which $LiPF_6$ at 1.3 mol/L was added to the complex solvent of EC:DEC=3:7 (volume ratio). Also, the lithium secondary battery cell of the Comparative Example (TAZO 0 wt %) was fabricated by the same method as in Example 18, except that TAZO was not used.

Figure 8:
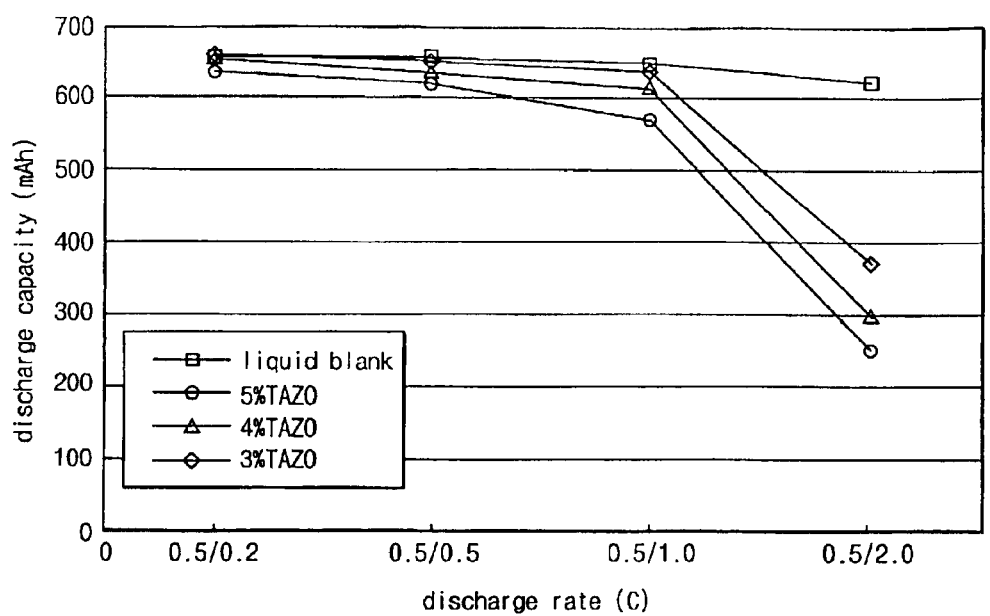
FIG. 8 is a graph exhibiting the relationship between a discharge rate and a discharge capacity of the lithium secondary battery comprising a polymer electrolyte comprising TAZO at 0 to 5 wt %.

The rate tests of the lithium secondary battery cell after formation were done under the same test condition as in Example 14. FIG. 8 shows the results of rate tests at 0.2C, 0.5C, 1.0C, and 2.0C. As shown in FIG. 8, at a discharge rate of 2.0C, the discharge capacity of the lithium secondary battery cells comprising the TAZO at 3, 4, and 5 wt % decrease by as much as the quantity of the TAZO increases compared with the discharge capacity of the lithium secondary battery cell not comprising the TAZO. But at the rate of less than 1.0C, the discharge capacity of the lithium secondary battery cell does not decrease. In particular, the discharge capacity of the lithium secondary battery cell comprising the TAZO at 3 wt % does not decrease compared with the discharge capacity of the lithium secondary battery cell not comprising the TAZO at less than 1.0C. From this it is known that the presence of the TAZO in the battery cell does not have a negative influence on the battery cell.

EXAMPLE 19

Example 19 reveals the cycle life characteristics of the lithium secondary battery cell comprising TAZO. A battery cell as shown in FIG. 4 was prepared as follows: a positive electrode 30 comprising $LiCoO_2$ as the positive active material, a negative electrode 10 comprising carbon as the negative active material, and a porous polypropylene separator 20 were rolled and inserted into an aluminate battery cell container; polymer electrolyte prepared by adding the TAZO at 3 wt % to organic electrolyte was inserted into the battery cell container; and the mixture was agitated and the battery cell container was sealed and left for 24 hours. The length of the battery cell was 62 mm, the breadth 35 mm, and the thickness 3.6 mm.

The organic electrolyte used in Examples 17 and 18 was a mixture in which $LiPF_6$ at 1.3 mol/L was added to the complex solvent of EC:DEC=3:7 (volume ratio).

Also, a Comparative Example (liquid blank) lithium secondary battery cell was fabricated as in Example 19 except that the TAZO was not used.

After formation, the prepared lithium secondary battery cells were charged and discharged under the following charge and discharge condition: the battery cells were charged until the voltage reached 4.2V with a constant 1C current, and then charged for 2.5 hours at 4.2V. That is, the charge condition was a constant current-constant voltage charge.

The discharge condition was as follows: the battery cells were discharged until the voltage reached 2.75V with a constant 1C current.

Figure 9:
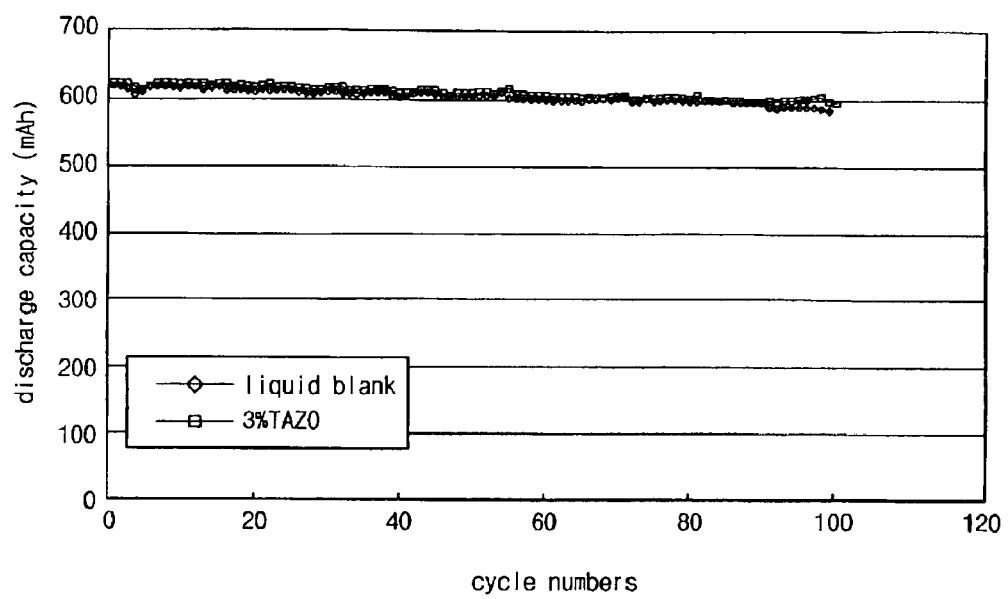
FIG. 9 is a graph exhibiting cycle life characteristics of the lithium secondary battery comprising a polymer electrolyte comprising TAZO at 3 wt %.

FIG. 9 shows the test results of the discharge capacity of each cycle. The total number of cycles was 100. As shown in FIG. 9, there was no great difference between the discharge capacity of the gel polymer lithium secondary battery cell comprising the TAZO at 3 wt % (3 wt % TAZO) and the discharge capacity of the lithium secondary battery cell not comprising the TAZO (liquid blank) after 100 charge and discharge cycles. Thus, the presence of the TAZO in the battery cell did not have any negative influence on the characteristics of the battery cell. Also, it was known that a film did not form on the surface of the negative electrode of the lithium secondary battery cell comprising the TAZO at 3 wt % (3 wt % TAZO) of Example 19, because the gelation had almost ended before formation.

EXAMPLE 20

Example 20 reveals the high temperature characteristics of the lithium secondary battery cell comprising TAZO. A gel polymer lithium secondary battery cell comprising the TAZO at 3 wt % (3 wt % TAZO) was prepared by the same method as in Example 19. Also, a comparative lithium secondary battery cell that did not include the TAZO (liquid blank) was prepared by the same method as in Example 19.

The prepared lithium secondary battery cell was tested through the following procedures after formation:
a) the battery cell was charged until the voltage reached 4.2V with a constant 1C current, and the battery cell was further charged for 2.5 hours at 4.2V to the state of full charge. That is, the charge condition was a constant current-constant voltage charge.
b) the charged battery cell was left for 4 hours at 85° C.
c) after recovering to room temperature the battery cell that was left for 4 hours at 85°, the battery cell was discharged until the voltage reached 2.75V with a constant current of 0.2C, and the discharge capacity was measured. The discharge capacity was called 85° C., 4 hours retention capacity.
d) after recharging the discharged battery cell of c) to the state of full charge under the same condition as in a), the battery cell was discharged until the voltage reached 2.75V with a constant current of 0.2C, and the discharge capacity was measured. The discharge capacity was called recovery capacity 1.
e) after recovering the battery cell of d) to full charge under the same condition as in a), the battery cell was left for 24 hours at 85° C.
f) after recovering to room temperature the battery cell left for 24 hours at 85° C., the battery cell was discharged until the voltage reached 2.75V with a constant current of 0.2C, and the discharge capacity was measured. The discharge capacity was called 85° C., 24 hours retention capacity.
g) after recharging the discharged battery cell of f) to the state of full charge under the same condition as in a), the battery cell was discharged until the voltage reached 2.75V with a constant current of 0.2C, and the discharge capacity was measured. The discharge capacity was called recovery capacity 2.

Figure 10:
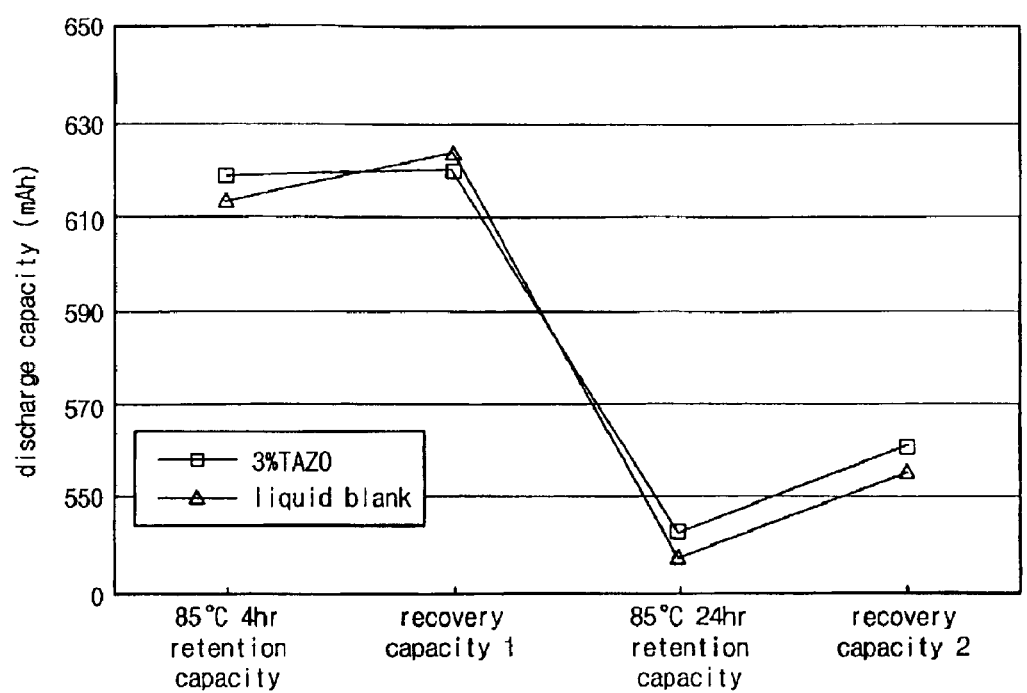
FIG. 10 is a graph exhibiting retention characteristics at a high temperature of the lithium secondary battery comprising a polymer electrolyte comprising TAZO at 3 wt %.

FIG. 10 shows the results of the above test. As shown in FIG. 10, there was no great difference between the retention capacity of the gel polymer lithium secondary battery cell comprising the TAZO of 3 wt % (3 wt % TAZO) and the retention capacity of the lithium secondary battery cell not comprising the TAZO (liquid blank). Further, the presence of TAZO in the battery cell did not have any negative influence on the high temperature retention characteristics of the battery cell.

EXAMPLE 21

Examples 21 reveals the cycle life characteristics of the lithium secondary battery cell comprising non-gelated electrolyte.

Coin-type battery cells were fabricated by the following procedure: a positive electrode 30 comprising $LiCoO_2$ as a positive active material and a porous polypropylene separator 20 for each battery cell were inserted and packed into positive electrode cases; polymer electrolytes comprising the TAZM at 0.2, 0.5, and 1.0 wt %, or the TAZO at 0.2, 0.5, and 1.0 wt % were respectively inserted into each case; the entrance of each positive electrode case was sealed with a negative electrode 10 and negative electrode cover; and the battery cell containers were left for 24 hours at room temperature. The diameter of each coin-type battery cell was 20 mm, and the height of each was 1.6 mm (CR2016).

The prepared electrolytes did not gelate after being left at room temperature for 24 hours.

The organic electrolytes used in Example 21 were mixtures in which $LiPF_6$ at 1.3 mol/L was added to the complex solvent of EC:DEC=3:7(volume ratio).

A comparative lithium secondary battery cell was fabricated by the same method as in Example 21, except that the TAZM or the Me-TAZM was not used.

After formation, the prepared lithium secondary battery cells were charged and discharged under the following charge and discharge conditions: the battery cells were charged until the voltage reached 4.2V with a constant 1C current, and they were further charged for 2.5 hours at 4.2V. That is, the charge condition was a constant current-constant voltage charge.

The discharge condition was as follows: the battery cells were discharged until the voltage reached 2.75V with a constant 1C current.

Figure 12:
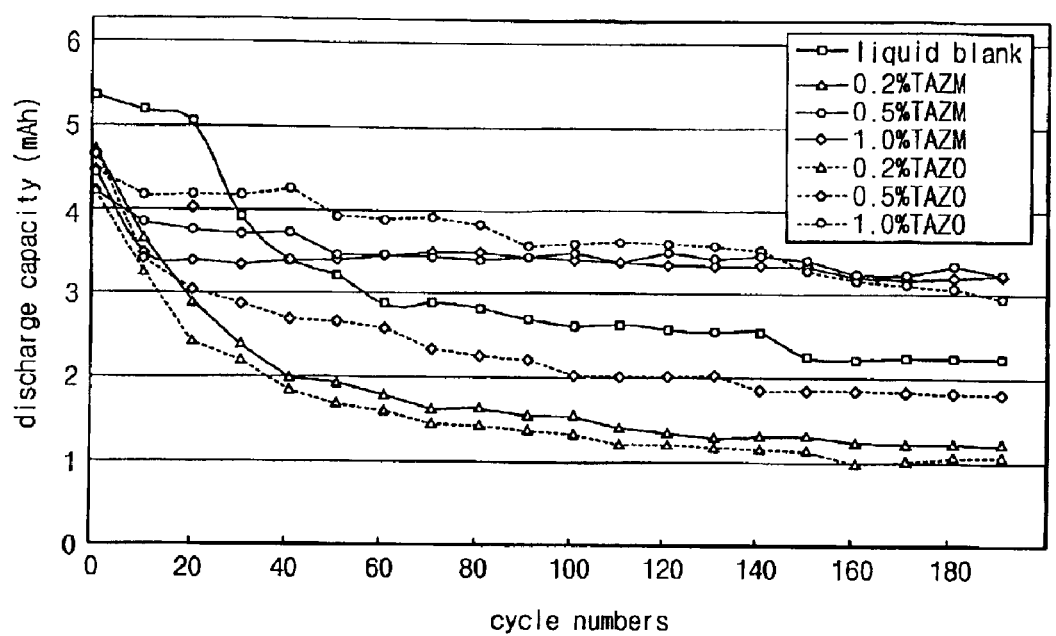
FIG. 12 is a graph exhibiting cycle life characteristics of the lithium secondary battery comprising non-gelated electrolyte comprising TAZO or TAZM.

FIG. 12 shows the test results of the discharge capacity of each cycle. The total number of cycles was 190. As shown in FIG. 12, the discharge capacity of the gel polymer lithium secondary battery cell comprising the TAZM at 1 wt % and the TAZO at 1 wt % (1 wt % TAZM, 1 wt % TAZO) was higher than the discharge capacity of the lithium secondary battery cell not comprising the TAZM or the TAZO (liquid blank) after 50 cycles of charge and discharge. This difference is attributed to the film formed by the TAZM or the TAZO on the surface of the negative electrode 10 that restrained the reaction between the negative electrode 30 and the electrolyte.

Also, the discharge capacity of the gel polymer lithium secondary battery cell comprising the TAZM at 0.5 wt % or the TAZO at 0.5 wt % (0.5 wt % TAZM, 0.5 wt % TAZO) was close to the same as the discharge capacity of the lithium secondary battery cell not comprising the TAZM or the TAZO (liquid blank) after 50 cycles of charge and discharge. However, the discharge capacity of the gel polymer lithium secondary battery cell comprising the TAZM at 0.2 wt % or the TAZO at 0.2 wt % (0.2 wt % TAZM, 0.2 wt % TAZO) was a little lower than the discharge capacity of the lithium secondary battery cell not comprising the TAZM or the TAZO (liquid blank) after 50 cycles of charge and discharge. Therefore, it was known that, in order to improve the cycle life characteristics of a lithium secondary battery, the quantity of the TAZM or the TAZO was respectively over 0.2 wt % or 0.5 wt %.

EXAMPLE 22

Example 22 reveals the cycle life characteristics of the lithium secondary battery cell comprising non-gelated electrolyte. Battery cells as shown in FIG. 4 were prepared as follows: a positive electrode 30 comprising $LiCoO_2$ as the positive active material, a negative electrode 10 comprising carbon as the negative active material, and a porous polypropylene separator 20 were rolled for each battery cell and inserted into aluminate battery cell containers; electrolytes comprising the TAZM at 0.2, 0.5, 1.0 wt % or the TAZO at 0.5, 1.0 wt % were respectively inserted into each battery cell; the entrance of each battery cell container was sealed with a negative electrode 10 and negative electrode cover; and the battery cell containers were left for 24 hours at room temperature. None of the electrolytes gelated. The length of each battery cell was 62 mm, the breadth 35 mm, and the thickness 3.6 mm.

The organic electrolytes used in Example 22 were a mixture to which $LiPF_6$ at 1.3 mol/L was added to the complex solvent of EC:DEC=3:7 (volume ratio).

A comparative lithium secondary battery cell was fabricated by the same method as in Example 22, except that the TAZM or the TAZO (liquid blank) was not used.

After formation, the prepared lithium secondary battery cells were charged and discharged under the following charge and discharge conditions: the battery cells were charged until the voltage reached 4.2V with a constant 1C current, and then they were further charged for 2.5 hours at 4.2V. That is, the charge condition was a constant current-constant voltage charge.

The discharge condition was as follows: the battery cells were discharged until the voltage reached 2.75V with a constant 1C current.

The FIG. 13 shows the test results of the discharge capacity of each cycle. The total number of cycles was 100. As shown in FIG. 13, the discharge capacities of the gel polymer lithium secondary battery cells comprising the TAZM at 0.5 or 1.0 wt % (0.5% TAZM, 1% TAZM) or the TAZO at 1.0 wt % (1% TAZO) were higher than the discharge capacity of the lithium secondary battery cell not comprising the TAZM or the TAZO (liquid blank) after 5 cycles of charge and discharge. This difference is attributed to the film formed by the TAZM or the TAZO on the surface of the negative electrode restrained the reaction of the negative electrode and the electrolyte.

The discharge capacity of the gel polymer lithium secondary battery cell comprising the TAZM at 0.2 wt % (0.2% TAZM) or the TAZO at 0.5 wt % (0.5% TAZO) was a little lower than the discharge capacity of the lithium secondary battery cell not comprising the TAZM or the TAZO (liquid blank) after 10 cycles of charge and discharge. Therefore it was known that, in order to improve the cycle life characteristics of a lithium battery, the quantities of the TAZM or the TAZO were respectively 0.5 wt % or 1.0 wt %.

Also, the cycle life characteristics were higher for the lithium secondary battery cell of Example 22 than the lithium secondary battery cell of Example 21. This difference is attributed to the lithium secondary battery cell of Example 22 being fabricated by rolling as shown in FIG. 4, and the voltage between the positive and negative electrodes 30 and 10 was uniform.

As explained above, the electrolyte of the present invention is stable at high temperature because the present invention relates to a gel-forming polymer electrolyte comprising a gel-forming compound connected by the metal cations and the organic electrolyte of the lithium salt and the aprotic solvent. Further, the gel forms by simply mixing the gel-forming compound and the organic electrolyte. Also, the lithium secondary battery cell comprising the electrolyte shows good cycle life characteristics because of the restraint of the decomposition reaction of the electrolyte on the surface of the negative electrode.

While the present invention has been described in detail with reference to the preferred embodiments, those skilled in the art will appreciate that various modifications and substitutions can be made thereto without departing from the spirit and scope of the present invention as set forth in the accompanying claims and equivalents thereof.

What is claimed is:

1. A gel-forming polymer electrolyte comprising:
   an aziridine ring containing gel-forming compound connected by metal cations; and
   an organic electrolyte of a lithium salt and an aprotic solvent.

2. The gel-forming polymer electrolyte of claim 1, wherein said gel-forming compound is a monomer or a polymer.

3. The gel-forming polymer electrolyte of claim 1, wherein the metal cations are an alkali metal or an alkali earth metal.

4. The gel-forming polymer electrolyte of claim 1, wherein the metal cations are selected from the group consisting of lithium ions, sodium, potassium, and calcium.

5. The gel-forming polymer electrolyte of claim 1, wherein said gel-forming compound is a nitrogen compound of which the nitrogen has a lone electron pair.

6. The gel-forming polymer electrolyte of claim 1, wherein:

said aziridine ring containing gel-forming compound is selected from the group consisting of aziridine ring-containing compounds having the form of Formulas 1 to 4 and a mixture thereof, Formula 1 is

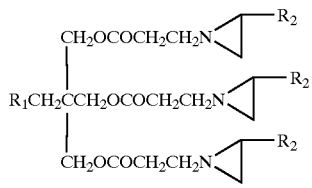

wherein $R_1$ is H, $CH_3$ or OH, and $R_2$ is H or $CH_3$,

Formula 2 is

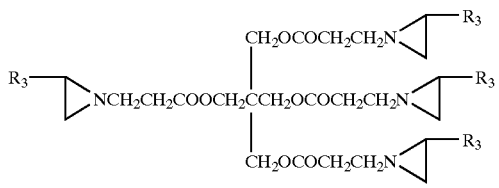

wherein $R_3$ is H or $CH_3$,

Formula 3 is

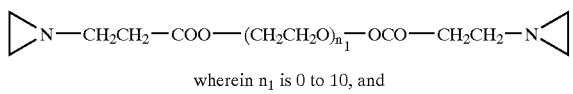

wherein $n_1$ is 0 to 10, and

Formula 4 is

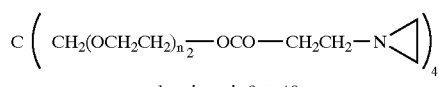

wherein $n_2$ is 0 to 10.

7. The gel-forming polymer electrolyte of claim 6, wherein said gel forming compound comprises a first aziridine ring compound of Formulas 1 and/or 2 to which a second aziridine ring compound of Formulas 3 and/or 4 is added.

8. The gel-forming polymer electrolyte of claim 1, wherein the aprotic solvent is selected from the group consisting of ethylene carbonate, butylene carbonate, propylene carbonate, γ-butyrolactone, dimethyl carbonate, methylethyl carbonate, diethyl carbonate, and a mixture thereof.

9. The gel-forming polymer electrolyte of claim 1, wherein the lithium salt is selected from the group consisting of $LiPF_6$, $LiBF_4$, $LiSbF_6$, $LiClO_4$, $LiCF_3SO_3$, $Li(CF_3SO_2)_2N$, $LiC_4F_9SO_3$, $LiAlO_4$, $LiAlCl_4$, $LiN(C_xF_{2x+1}SO_2)(C_yF_{2y+1}SO_2)$ (wherein x and y are natural numbers), and a mixture thereof.

10. The gel-forming polymer electrolyte of claim 9, wherein a concentration of the lithium salt is 0.5 to 2.0 mol/M.

11. The gel-forming polymer electrolyte of claim 1, wherein a quantity of said gel-forming compound is 0.2 to 20 wt % of an overall weight of the polymer electrolyte.

12. The gel-forming polymer electrolyte of claim 11, wherein the quantity is of said gel-forming compound is at or between 0.5 and 10 wt %.

13. The gel-forming polymer electrolyte of claim 1, wherein at least ones of said gel-forming compound coordinate with a lithium of the lithium salt, and said gel-forming compound is partially or completely gelated.

14. A lithium secondary battery comprising:

a polymer electrolyte of claim 1; and a positive and a negative electrode that intercalates and deintercalates lithium ions through said polymer electrolyte.

15. The lithium secondary battery of claim 14, wherein a film of the gel-forming compound of said polymer electrolyte is formed on a surface of said negative electrode.

16. The lithium secondary battery of claim 15, wherein said polymer electrolyte is not completely gelated.

17. The lithium secondary battery of claim 15, wherein said polymer electrolyte is completely gelated.

18. The lithium secondary battery of claim 14, wherein said polymer electrolyte is completely gelated and a film of the gel-forming compound of said polymer electrolyte is formed on said negative electrode.

19. The lithium secondary battery of claim 14, further comprising a separator disposed between said positive and negative electrodes and into which said polymer electrolyte is impregnated.

20. The lithium secondary battery of claim 14, wherein the battery is charged such that the film of the gel-forming compound of said polymer electrolyte is on a surface of said negative electrode.

21. A gel-forming polymer electrolyte, comprising:

at least one aziridine ring-containing compound selected from the group consisting of the following Formulas 1 to 4; and an organic electrolyte of a lithium salt and an aprotic solvent, wherein Formula 1 is

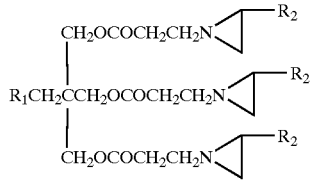

wherein $R_1$ is H, $CH_3$ or OH, and $R_2$ is H or $CH_3$,

Formula 2 is

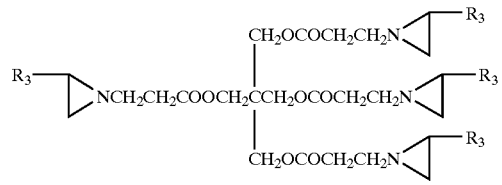

wherein $R_3$ is H or $CH_3$,

Formula 3 is

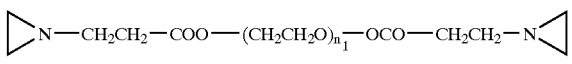

wherein $n_1$ is 0 to 10, and

-continued

Formula 4 is

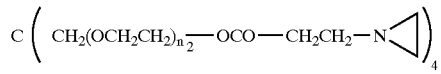

wherein $n_2$ is 0 to 10.

22. The gel-forming polymer electrolyte of claim 21, wherein said at least one aziridine ring-containing compound is a TAZM (trimethylolpropane-β-aziridinylpropionate) or an Me-TAZM (trimethylolpropane-β-aziridinylpropionate).

23. The gel-forming polymer electrolyte of claim 21, wherein a quantity of said at least one azindine ring-containing compound is 0.2 to 20 wt % of an overall weight of the polymer electrolyte.

24. The gel-forming polymer electrolyte of claim 21, wherein said at least one aziridine ring-containing compound comprises at least two gel-forming compounds that coordinate with a lithium of the lithium salt, and the two gel-forming compounds are partially or completely gelated.

25. The gel-forming polymer electrolyte of claim 21, wherein an aziridine ring of said at least one aziridine ring-containing compound opens to form a polymer and the organic electrolyte impregnates the polymer.

26. A lithium secondary battery comprising:
a polymer electrolyte of claim 21; and
a positive and a negative electrode that intercalate and deintercalate lithium ions through said polymer electrolyte.

27. The lithium secondary battery of claim 26, wherein a film of a gel-forming compound of said polymer electrolyte is on a surface of said negative electrode, the gel-forming compound comprising the at least one aziridine ring-containing compound and the organic electrolyte of the lithium salt and the aprotic solvent.

28. The lithium secondary battery of claim 27, wherein said polymer electrolyte is not completely gelated.

29. The lithium secondary battery of claim 27, wherein said polymer electrolyte is completely gelated.

30. The lithium secondary battery of claim 26, wherein said polymer electrolyte is completely gelated and a film of the gel-forming compound of said polymer electrolyte is not formed on said negative electrode.

31. The lithium secondary battery of claim 26, wherein said polymer electrolyte is completely gelated such that a film of the gel-forming compound of said polymer electrolyte is not formed on said negative electrode, the gel-forming compounds comprising the at least one aziridine ring-containing compound and the organic electrolyte of the lithium salt and the aprotic solvent.

32. A lithium secondary battery comprising:
a polymer electrolyte of claim 21;
a positive electrode that intercalates and deintercalates lithium ions; and
a negative electrode that intercalates and deintercalates lithium ions with said positive electrode through said polymer electrolyte,
wherein a film of a gel-forming compound of said polymer electrolyte is on a surface of said negative electrode, the gel-forming compound comprising the at least one aziridine ring-containing compound and the organic electrolyte of the lithium salt and the aprotic solvent.

33. A lithium secondary battery comprising:
a polymer electrolyte comprising an azindine ring containing gel-forming compound connected by metal cations; and an organic electrolyte of a lithium salt and an aprotic solvent;
a positive electrode; and
a negative electrode that intercalates and deintercalates lithium ions with said positive electrode through said polymer electrolyte,
wherein the battery is charged such that a film of the gel-forming compound of said polymer electrolyte is on a surface of said negative electrode.

34. A lithium secondary battery comprising:
a polymer electrolyte;
a positive and a negative electrode that intercalates and deintercalates lithium ions through said polymer electrolyte; and
a separator disposed between said positive and negative electrodes and into which said polymer electrolyte is impregnated,
wherein:
the polymer electrolyte comprises a gel-forming compound connected by metal cations, and an organic electrolyte of a lithium salt and an aprotic solvent, and
the lithium secondary battery is manufactured by inserting said separator between said positive and negative electrodes, rolling said positive and negative electrodes with said separator therebetween, inserting into a container the rolled said positive and negative electrodes with said separator therebetween, and forming a film of the gel-forming compound of said polymer electrolyte on said negative electrode.

35. A method of forming a lithium secondary battery, comprising:
forming a battery cell by placing a polymer electrolyte between a positive electrode and a negative electrode, the polymer electrolyte comprising a gel-forming compound connected by metal cations and an organic electrolyte of a lithium salt and an aprotic salt; and
charging the formed battery cell such that a film of the gel forming compound forms on the negative electrode.

36. The method of claim 35, further comprising allowing the polymer electrolyte in the formed battery cell to gel.

37. The method of claim 35, wherein said forming the battery cell comprises:
inserting a separator between the positive and negative electrodes,
rolling the positive and negative electrodes with the separator therebetween,
inserting into a container the rolled positive and negative electrodes with the separator therebetween, and
inserting the polymer electrolyte into the container with the rolled positive and negative electrodes with the separator therebetween.

* * * * *

UNITED STATES PATENT AND TRADEMARK OFFICE
CERTIFICATE OF CORRECTION

PATENT NO. : 6,905,795 B2
DATED : June 14, 2005
INVENTOR(S) : Cheol-soo Jung et al.

It is certified that error appears in the above-identified patent and that said Letters Patent is hereby corrected as shown below:

Column 23,
Line 40, change "get-forming" to -- gel-forming --.

Column 25,
Line 14, change "azindine" to -- aziridine --.

Signed and Sealed this

Thirteenth Day of September, 2005

JON W. DUDAS
*Director of the United States Patent and Trademark Office*